United States Patent
Hong

(10) Patent No.: US 11,477,835 B2
(45) Date of Patent: Oct. 18, 2022

(54) METHOD AND APPARATUS FOR ACCESSING BASE STATION

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/668,337

(22) Filed: Oct. 30, 2019

(65) Prior Publication Data

US 2020/0068640 A1 Feb. 27, 2020

Related U.S. Application Data

(63) Continuation of application No. PCT/CN2017/083053, filed on May 4, 2017.

(51) Int. Cl.
*H04W 76/16* (2018.01)
*H04W 48/16* (2009.01)
*H04W 88/06* (2009.01)
*H04W 88/10* (2009.01)

(52) U.S. Cl.
CPC .......... *H04W 76/16* (2018.02); *H04W 48/16* (2013.01); *H04W 88/06* (2013.01); *H04W 88/10* (2013.01)

(58) Field of Classification Search
CPC ..... H04W 76/16; H04W 48/16; H04W 88/06; H04W 88/10
USPC .......................................................... 370/329
See application file for complete search history.

(56) References Cited

U.S. PATENT DOCUMENTS

| 8,346,315 | B2 | 1/2013 | Lindoff et al. |
| 2004/0009770 | A1* | 1/2004 | Sivanandan .......... H04W 28/18 |
| | | | 455/425 |
| 2008/0242308 | A1 | 10/2008 | Gunnarsson et al. |
| 2010/0124918 | A1 | 5/2010 | Agashe et al. |
| 2013/0060653 | A1* | 3/2013 | Sharkey ................ H04L 69/321 |
| | | | 705/26.3 |

(Continued)

FOREIGN PATENT DOCUMENTS

| CN | 1257634 A | 6/2000 |
| CN | 101557634 A | 10/2009 |

(Continued)

OTHER PUBLICATIONS

International Search Report and Written Opinion of PCT Application No. PCT/CN2017/083053, dated Jan. 24, 2018, issued by the State Intellectual Property Office of the P.R. China.

(Continued)

*Primary Examiner* — William Nealon
(74) *Attorney, Agent, or Firm* — Finnegan, Henderson, Farabow, Garrett & Dunner, L.L.P.

(57) ABSTRACT

A method for accessing a base station includes: receiving, from a plurality of base stations, working mode candidates corresponding to the plurality of base stations respectively, each of the working mode candidates being a working mode in which a corresponding base station supports a terminal accessing thereto to work; determining a target base station matching the multi-mode terminal from the plurality of base stations according to the working mode candidates and a plurality of working modes supported by the multi-mode terminal; and accessing to the target base station.

14 Claims, 9 Drawing Sheets

(56) References Cited

U.S. PATENT DOCUMENTS

| | | | |
|---|---|---|---|
| 2013/0215770 A1 | 8/2013 | Kim | |
| 2014/0187224 A1* | 7/2014 | Liu | H04W 24/02 455/418 |
| 2014/0211751 A1 | 7/2014 | Zhang et al. | |
| 2015/0131549 A1* | 5/2015 | Lu | H04W 88/10 370/329 |
| 2015/0264637 A1* | 9/2015 | Zaus | H04W 8/20 455/434 |
| 2016/0205495 A1* | 7/2016 | Hu | H04W 48/18 370/331 |
| 2018/0317217 A1* | 11/2018 | Montojo | H04W 48/12 |
| 2019/0190751 A1* | 6/2019 | Nguyen | H04L 5/001 |
| 2020/0128585 A1* | 4/2020 | Kuang | H04L 5/0094 |

FOREIGN PATENT DOCUMENTS

| | | |
|---|---|---|
| CN | 103384375 A | 11/2013 |
| CN | 103874073 A | 6/2014 |
| CN | 104661269 A | 5/2015 |
| CN | 105992303 A | 10/2016 |
| EP | 2 846 604 A1 | 3/2015 |
| JP | 2015111838 A | 6/2015 |
| RU | 2496279 C2 | 10/2013 |
| WO | WO 2013044522 A1 | 4/2013 |
| WO | WO 2013082893 A1 | 6/2013 |
| WO | WO 2015089736 A1 | 6/2015 |
| WO | WO 2016/137532 A1 | 9/2016 |
| WO | WO 2017/039952 A1 | 3/2017 |

OTHER PUBLICATIONS

First Office Action dated Mar. 25, 2019, in counterpart Chinese Application No. 201780000308.8 and English translation thereof.
Second Office Action dated Jun. 24, 2019, in counterpart Chinese Application No. 201780000308.8 and English translation thereof.
Russian Search Report of counterpart Russian Application No. 2019137041 dated May 14, 2020.
First Office Action of Russian Application No. 2019137041 dated May 15, 2020.
Extended European Search Report of counterpart EP Application No. 17908264.9 dated Nov. 11, 2020.
Notice of Rejection of Japanese Application No. 2019-560158 dated Nov. 20, 2020.
Notification of Reason for Refusal of Korean Application No. 10-2019-7035716 dated Jan. 20, 2021.
Acceptance Decision of Russian Application No. 2019137041 dated Jan. 21, 2021.
Search Report of Japanese Application No. 2019-560158 dated Nov. 20, 2020.
Intel Corporation, Mobility and paging reception for idle, 3GPP TSG RAN WG2 Meeting #95bis, R2-166879, Kaohsiung, Oct. 10-14, 2016, 3 pages.
Ericsson, Impact of mixed numerologies on UEs in idle mode, 3GPP TSG-RAN WG2#97bis, R2-1702662, Spokane, USA, Apr. 3-7, 2017, 2 pages.
Motorola Mobility, Lenovo, PRACH for an NR carrier supporting multiple numerologies, 3GPP TSG RAN WG1 #88 R1-1703045, Athens, Greece, Feb. 13-17, 2017, 3 pages.
3GPP TR 38.802 V1.1.0 (Jan. 2017), 3rd Generation Partnership Project; Technical Specification Group Radio Access Network; Study on New Radio (NR) Access Technology Physical Layer Aspects, (Release 14), 71 pages.
3GPP Ts 38.300 VO.1.0 (Mar. 2017), 3rd Generation Partnership Project; Technical Specification Group Radio Access Network; NG Radio Access Network; Overall Description; Stage 2 (Release 15), 29 pages.
Communication pursuant to Article 94(3) EPC of European Application No. 17908264.9 dated Mar. 28, 2022.

* cited by examiner

METHOD AND APPARATUS FOR ACCESSING BASE STATION

CROSS-REFERENCE TO RELATED APPLICATIONS

This application is a continuation of International Application No. PCT/CN2017/083053, filed May 4, 2017, the entire contents of which are incorporated herein by reference.

TECHNICAL FIELD

The present disclosure relates to the field of communication, and more particularly, relates to a method and apparatus for accessing a base station.

BACKGROUND

The 5G (i.e., NR (New Radio)) system-related standardization is being carried out in 3GPP (3rd Generation Partnership Project). In a 5G system, a multi-mode terminal may support numerology of different working modes, and different working modes correspond to different terminal capabilities, supportable network configurations and services.

SUMMARY

Embodiments of the present disclosure disclose a method and apparatus for accessing a base station.

According to a first aspect of embodiments of the present disclosure, there is provided a method for accessing a base station, which is applied to a multi-mode terminal. The method includes: receiving, from a plurality of base stations, working mode candidates corresponding to the plurality of base stations respectively, each of the working mode candidates being a working mode in which a corresponding base station supports a terminal accessing thereto to work; determining a target base station matching the multi-mode terminal from the plurality of base stations according to the working mode candidates and a plurality of working modes supported by the multi-mode terminal; and accessing the target base station.

According to a second aspect of embodiments of the present disclosure, there is provided a method for accessing a base station, which is applied to a base station. The method includes: transmitting one or more working mode candidates corresponding to the base station to a multi-mode terminal, such that the multi-mode terminal determines a target base station matching the multi-mode terminal from a plurality of base stations according to a plurality of working mode candidates that are transmitted by the plurality of base stations and correspond to the plurality of base stations respectively, and a plurality of working modes supported by the multi-mode terminal, wherein each of the working mode candidates is a working mode in which a corresponding base station supports a terminal accessing thereto to work.

According to a third aspect of embodiments of the present disclosure, there is provided a multi-mode terminal including: a processor; and a memory storing instructions executable by the processor, wherein the processor is configured to: receive, from a plurality of base stations, working mode candidates corresponding to the plurality of base stations respectively, each of the working mode candidates being a working mode in which a corresponding base station supports a terminal accessing thereto to work; determine a target base station matching the multi-mode terminal from the plurality of base stations according to the working mode candidates and a plurality of working modes supported by the multi-mode terminal; and access the target base station.

According to a fourth aspect of embodiments of the present disclosure, there is provided a base station including: a processor; and a memory configured storing instructions executable by the processor, wherein the processor is configured to: transmit working mode candidates corresponding to the base station to a multi-mode terminal, such that the multi-mode terminal determines a target base station matching the multi-mode terminal from a plurality of base stations according to a plurality of working mode candidates that are transmitted by the plurality of base stations and correspond to the plurality of base stations respectively, and a plurality of working modes supported by the multi-mode terminal, wherein each of the working mode candidates is a working mode in which a corresponding base station supports a terminal accessing thereto to work.

It is to be understood that both the foregoing general description and the following detailed description are exemplary and explanatory only, and are not intended to limit the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the disclosure as recited in the appended claims.

The terms used in the present disclosure are for the purpose of illustrating the specific embodiments only, rather than limiting the present disclosure. The terms "a" and "the" of singular forms used in the present disclosure and the attached claims are also intended to include their plural forms, unless otherwise clearly specified in the context. It can also be appreciated that the term "and/or" as used herein refers to any or all possible combinations of one or more associated items as listed.

It can be appreciated that, while the terms "first", "second", "third" and so on may be used herein to describe various information, such information is not limited to these terms, which are only used to distinguish between different information of the same category. For example, the first information can also be referred to as the second information, and similarly the second information can also be referred to as the first information, without departing from the scope of the present disclosure. Depending on the context, the term "if" as used herein can be interpreted as "when", "while", or "in response to determining".

Embodiments of the present disclosure provide a method for accessing a base station, which may be applied to a multi-mode terminal that supports a plurality of working modes. The multi-mode terminal may work in networks of different technical standards and support a plurality of network bands, that is, the multi-mode terminal supports a plurality of working modes.

Figure 1:
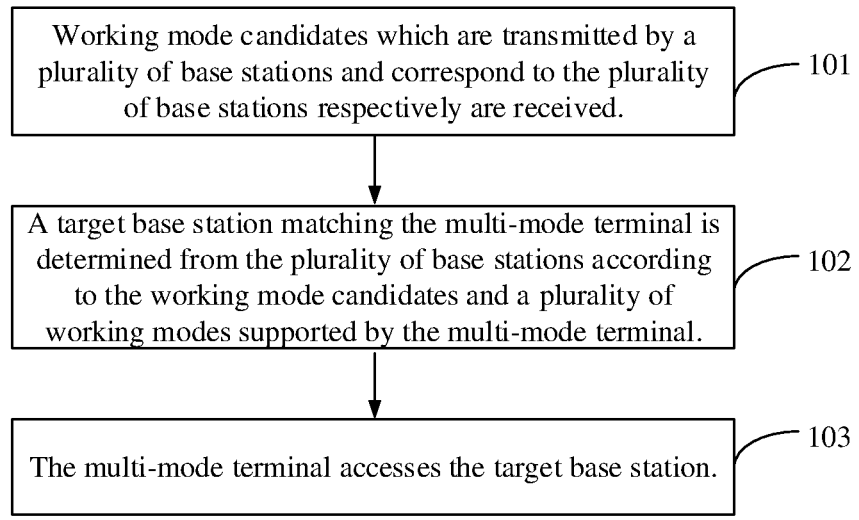
FIG. 1 is a flowchart of a method for accessing a base station in accordance with an exemplary embodiment.

FIG. 1 is a flowchart of a method for accessing a base station in accordance with an exemplary embodiment, which may include the following steps.

In step 101, working mode candidates which are transmitted by a plurality of base stations and correspond to the plurality of base stations respectively are received, each of the working mode candidates being a working mode in which the corresponding base station supports a terminal accessing thereto to work.

In step 102, a target base station matching the multi-mode terminal is determined from the plurality of base stations according to the working mode candidates and a plurality of working modes supported by the multi-mode terminal.

In step 103, the multi-mode terminal accesses the target base station.

In the above embodiment of the present disclosure, the multi-mode terminal may first receive the working mode candidates transmitted by the plurality of base stations, each of the working mode candidates being a working mode in which the corresponding base station supports the terminal accessing thereto to work. Further, the multi-mode terminal determines a target base station matching the multi-mode terminal from the plurality of base stations according to the working mode candidates and the plurality of working modes supported by the multi-mode terminal itself, and further accesses the target base station. Through the above process, the multi-mode terminal can select the target base station matching the multi-mode terminal from the plurality of base stations, and then access the target base station, thereby achieving the purpose of allowing the multi-mode terminal to work normally.

With respect to the step 101, a current base station may transmit a working mode that supports the terminal accessing thereto to work, i.e., a working mode candidate corresponding to the current base station, to the multi-mode terminal in a coverage range of the current base station. Each base station may correspond to one or more working mode candidates, each working mode candidate corresponding to one carrier band. In an embodiment, the current base station may broadcast the working mode candidate in system information.

In this step, the multi-mode terminal directly may receive the corresponding working mode candidates transmitted by the plurality of base stations directly according to related technologies.

With respect to the step 102, after receiving the working mode candidates which are transmitted by the plurality of base stations and correspond to the plurality of base stations respectively, the multi-mode terminal may determine the target base station matching the multi-mode terminal from the plurality of base stations according to the working mode candidates and the plurality of working modes supported by the multi-mode terminal itself.

Figure 2:
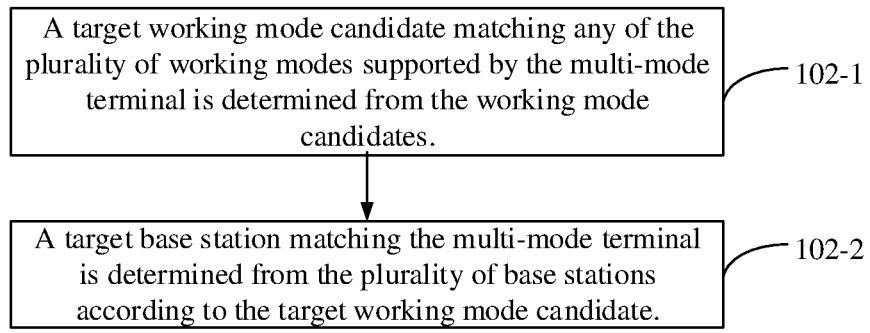
FIG. 2 is a flowchart of a method for accessing a base station in accordance with an exemplary embodiment.

An exemplary process of determining the target base station is shown in FIG. 2. FIG. 2 is a flowchart of a further method for accessing a base station in accordance with the embodiment shown in FIG. 1, which may include the following steps.

In step 102-1, a target working mode candidate matching any of the plurality of working modes supported by the multi-mode terminal is determined from the working mode candidates.

In this step, the working mode candidates corresponding to the plurality of base stations respectively, which are received by the multi-mode terminal, may be as shown in Table 1.

TABLE 1

| Base stations | Working mode candidates |
|---|---|
| Base station 1 | Mode A and Mode D |
| Base station 2 | Mode B |
| Base station 3 | Mode C and Mode D |
| ... | ... |

The multi-mode terminal may determine a target working mode candidate matching any of the plurality of working modes supported by the multi-mode terminal itself according to Table 1. For example, the plurality of working modes supported by the multi-mode terminal are assumed to be Mode A and Mode E. Then, the multi-mode terminal may determine that Mode A is a target working mode candidate according to Table 1.

In step 102-2, a target base station matching the multi-mode terminal is determined from the plurality of base stations according to the target working mode candidate.

In the embodiment of the present disclosure, the step 102-2 may include the following two cases.

In the first case, if the number of target working mode candidates is equal to 1: the multi-mode terminal may use the base station corresponding to the target working mode candidate in the plurality of base stations directly as a target base station matching the multi-mode terminal.

For example, the plurality of working modes supported by the multi-mode terminal include Mode A and Mode E, the number of target working mode candidates determined according to Table 1 is 1, and the target working mode candidate is Mode A. Then, the base station 1 corresponding to Mode A is the target base station matching the multi-mode terminal.

In the second case, if the number of target working mode candidates is greater than 1: the multi-mode terminal may select the target base station according to current service requirements thereof.

First, the multi-mode terminal may determine a target working mode candidate matching the current service requirements from the plurality of target working mode candidates. The service requirements may include a requirement for delay and/or a requirement for a carrier band.

For example, the plurality of working modes supported by the multi-mode terminal includes Mode A, Mode C, and Mode E, and the number of target working mode candidates determined according to Table 1 is 2, i.e., Mode A and Mode C, respectively. The current service requirement of the multi-mode terminal needs to ensure low delay, while Mode C in the target working mode candidates can meet the service requirement for low delay. Then, Mode C is the target working mode candidate matching the current service requirement of the multi-mode terminal.

For another example, the plurality of working modes supported by the multi-mode terminal include Mode A, Mode C, and Mode E, and the number of target working mode candidates determined according to Table 1 is 2, i.e., Mode A and Mode C, respectively. Mode A corresponds to a carrier band 1, and Mode C corresponds to a carrier band 3. When the current service requirement of the multi-mode terminal requires the multi-mode terminal to work on the carrier band 3, it may also be determined that Mode C is the target working mode candidate matching the current service requirement of the multi-mode terminal.

Further, the multi-mode terminal uses a base station corresponding to the target working mode candidate matching the current service requirement as a target base station matching the multi-mode terminal.

For example, in the above embodiment, the number of target working mode candidates is 2, i.e., Mode A and Mode C, respectively. Mode C is the target working mode candidate matching the current service requirement of the multi-mode terminal. Then, the multi-mode terminal uses the base station 3 as a target base station matching the multi-mode terminal according to Table 1.

In the above embodiment, when the number of target working mode candidates is equal to 1, the base station corresponding to the target working mode candidate is used as the target base station matching the multi-mode terminal. When the number of target working mode candidates is greater than 1, the base station corresponding to the target working mode candidate matching the current service requirement of the multi-mode terminal is used as the target base station matching the multi-mode terminal. Through the above process, the target base station matching the multi-mode terminal can be determined by the multi-mode terminal from the plurality of base stations, such that the multi-mode terminal can work normally after accessing the target base station.

With respect to the step 103, after determining the target base station from the plurality of base stations, the multi-mode terminal may transmit an access request for accessing the target base station to the target base station according to related technologies. The target base station establishes a wireless connection with the target terminal on the basis of the access request, thereby completing a process of accessing the multi-mode terminal to the target base station and ensuring that the multi-mode terminal accesses to the target base station matching the multi-mode terminal and may subsequently work normally.

Figure 3:
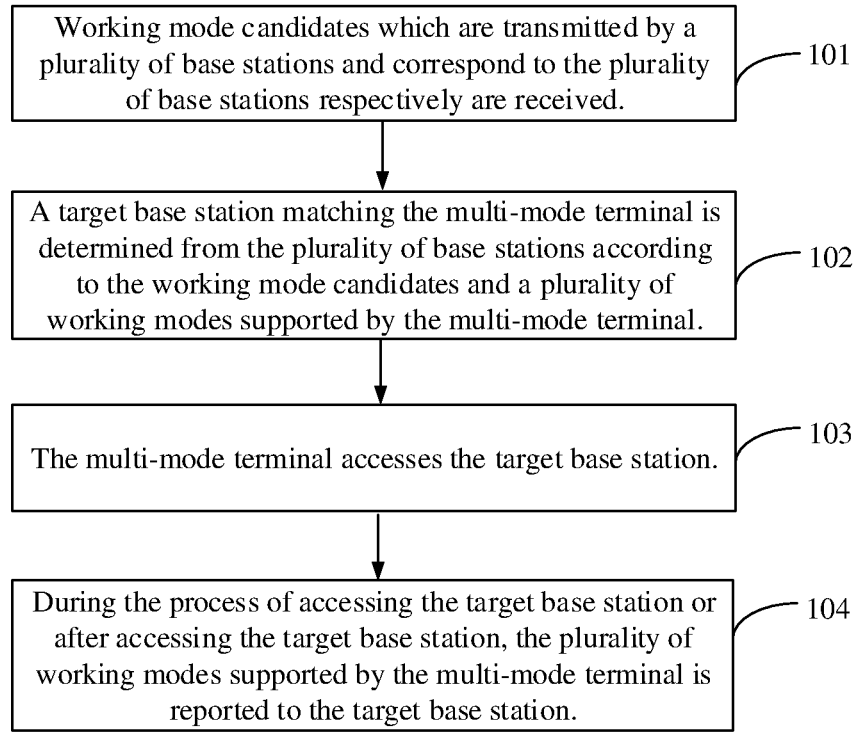
FIG. 3 is a flowchart of a method for accessing a base station in accordance with an exemplary embodiment.

FIG. 3 is a flowchart of another method for accessing a base station in accordance with the embodiment of FIG. 1. The method may further include step 104.

In step 104, during the process of accessing the target base station or after accessing the target base station, the plurality of working modes supported by the multi-mode terminal is reported to the target base station, such that the target base station configures a target working mode matching the multi-mode terminal on the basis of the plurality of working modes.

In the embodiment of the present disclosure, step 104 may be performed simultaneously with step 103 or performed after step 103 is completed. That is, the multi-mode terminal may report the plurality of working modes to the target base station during the process of accessing the target base station or after accessing the target base station. The target base station selects the most matching target working mode for the multi-mode terminal from the plurality of working modes according to information such as a current service type of the multi-mode terminal. Further, the target base station may transmit target network configuration information corresponding to the target working mode to the multi-mode terminal according to a correspondence relationship between a predetermined working mode and network configuration information. After performing the network configuration according to the target network configuration information transmitted by the target base station, the multi-mode terminal may work in the target working mode, such that the multi-mode terminal can work normally.

Through the above process, the multi-mode terminal may report the plurality of working modes supported by the multi-mode terminal itself to the target base station during the process of accessing the target base station or after accessing the target base station. The target base station configures the matching target working mode for the multi-mode terminal, thereby further ensuring that the multi-mode terminal can work normally after accessing the target base station.

Figure 4:
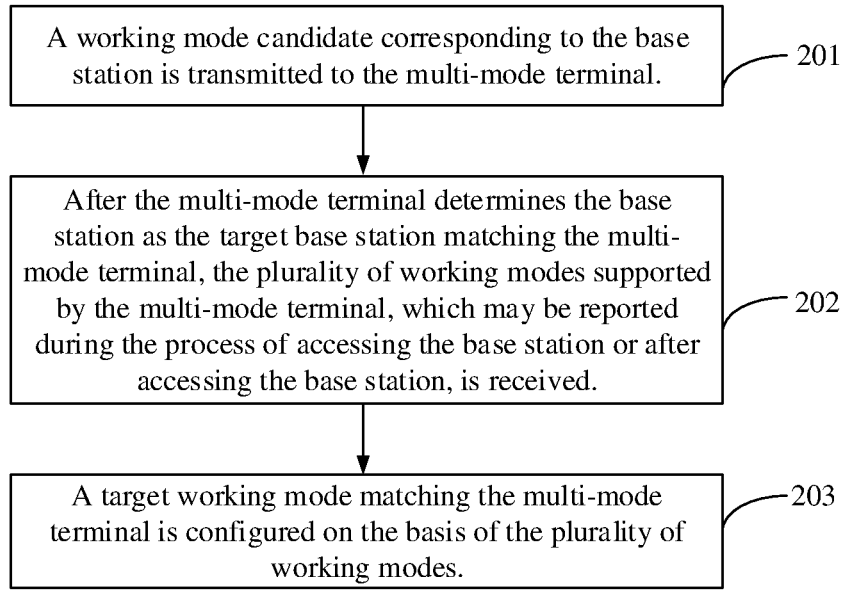
FIG. 4 is a flowchart of a method for accessing a base station in accordance with an exemplary embodiment.

FIG. 4 is a flowchart of another method for accessing a base station in accordance with an exemplary embodiment, which may be applied to a base station. The method includes the following steps.

In step 201, a working mode candidate corresponding to the base station is transmitted to the multi-mode terminal, such that the multi-mode terminal determines a target base station matching the multi-mode terminal from the plurality of base stations according to the working mode candidates that are transmitted by a plurality of base stations and correspond to the plurality of base stations respectively and a plurality of working modes supported by the multi-mode terminal, wherein each of the working mode candidates is a working mode in which the corresponding base station supports a terminal accessing thereto to work.

In the embodiment, the base station may transmit the working mode candidate corresponding to the base station to the multi-mode terminal. The multi-mode terminal may determine a target base station matching the multi-mode terminal from the plurality of base stations according to the working mode candidates that are transmitted by the plurality of base stations and correspond to the plurality of base stations respectively and the plurality of working modes supported by the multi-mode terminal. Through the above process, the base stations transmit the working mode candidates corresponding to the base stations to the multi-mode terminal, such that the multi-mode terminal determines the target base station matching the multi-mode terminal, and ensures that the multi-mode terminal can work normally.

In an embodiment, the base station may transmit the working mode candidate to the multi-mode terminal by using system information. The system information may be key system information or other system information, wherein the key system information refers to minimum system information required for the terminal to randomly access to the base station, and the other system information refers to system information other than the key system information.

In this step, the base station may carry a working mode candidate corresponding to the base station in the key system information, and broadcast the system information to the multi-mode terminal. Alternatively, the base station may carry the working mode candidate in the other system information, and transmit the other system information to the multi-mode terminal by means of broadcast or unicast. The base station may correspond to one or more working mode candidates, each working mode candidate corresponding to one carrier band.

The multi-mode terminal may select a target base station matching the multi-mode terminal to access according to the received working mode candidates corresponding to the plurality of base stations respectively and the plurality of working modes supported by the multi-mode terminal itself.

In step 202, after the multi-mode terminal determines the base station as the target base station matching the multi-mode terminal, the plurality of working modes supported by the multi-mode terminal, which may be reported during the process of accessing the base station or after accessing the base station, is received.

In this step, after determining the current base station as the target base station, the multi-mode terminal may report the plurality of working modes supported by the multi-mode terminal during the process of accessing the base station or after accessing the base station, and the base station then receives the plurality of working modes directly.

In step 203, a target working mode matching the multi-mode terminal is configured on the basis of the plurality of working modes.

In the embodiment of the present disclosure, in order to further ensure that the multi-mode terminal can work normally, after receiving the plurality of working modes supported by the multi-mode terminal, the base station may determine a most matching target working mode for the multi-mode terminal according to information, such as a current service type of the multi-mode terminal.

Further, the base station may determine target network configuration information corresponding to the target working mode according to a correspondence relationship between a predetermined working mode and network configuration information, and transmit the target network configuration information to the multi-mode terminal. The multi-mode terminal performs network configuration according to the target network configuration information, such that the multi-mode terminal can work normally.

Figure 5A:
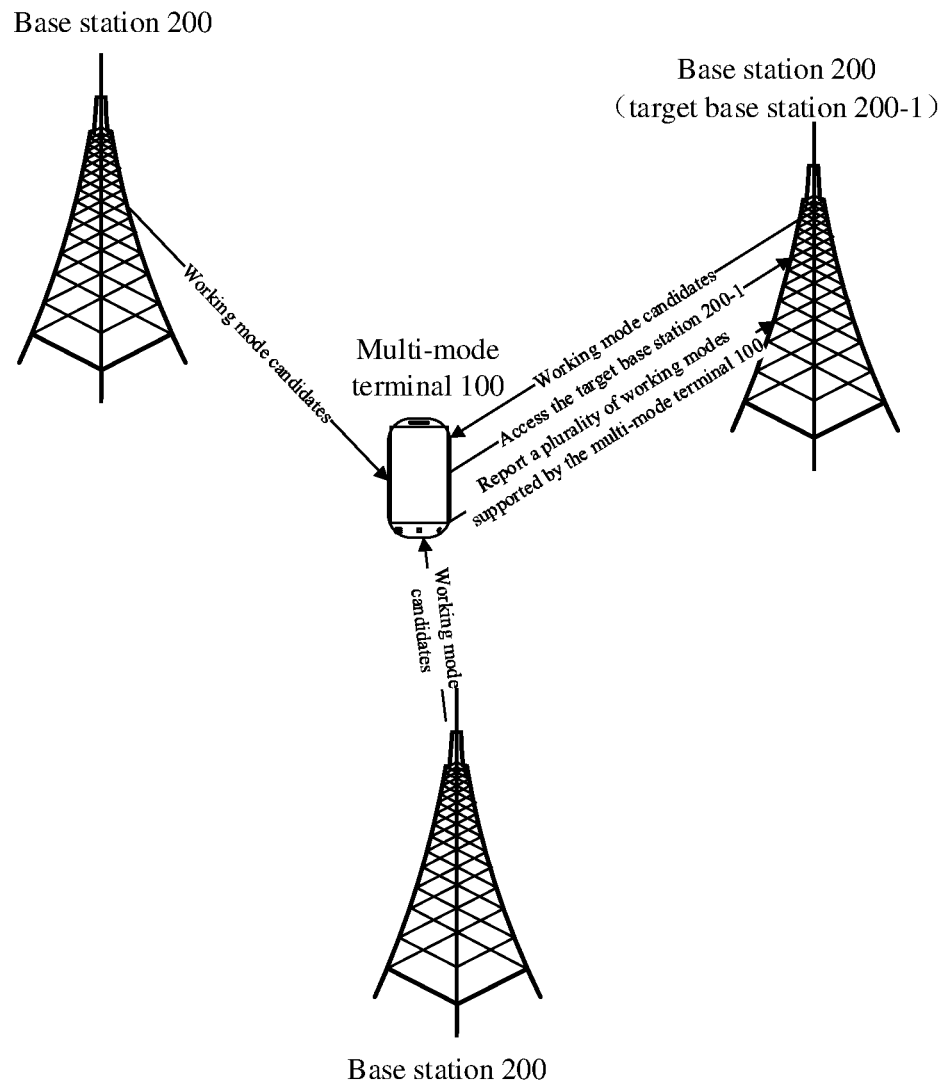
FIG. 5A is a schematic diagram showing a scenario of accessing a base station in accordance with an exemplary embodiment.

FIG. 5A is a schematic diagram showing a scenario of accessing a base station in accordance with an exemplary embodiment. After receiving the working mode candidates which are transmitted by a plurality of base stations 200 and correspond to the plurality of base stations 200 respectively, a multi-mode terminal 100 determines a target base station matching the multi-mode terminal 100 from the plurality of base stations 200 according to the working mode candidates and a plurality of working modes supported by the multi-mode terminal 100. Assuming that the target base station is 200-1, further, the multi-mode terminal 100 may access the target base station 200-1.

During the process of accessing the target base station 200-1 or after accessing the target base station 200-1, the multi-mode terminal 100 may report a plurality of working modes supported by the multi-mode terminal 100 to the target base station 200-1. The target base station 200-1 may configure a target working mode matching the multi-mode terminal 100 on the basis of the plurality of working modes.

Figure 5B:
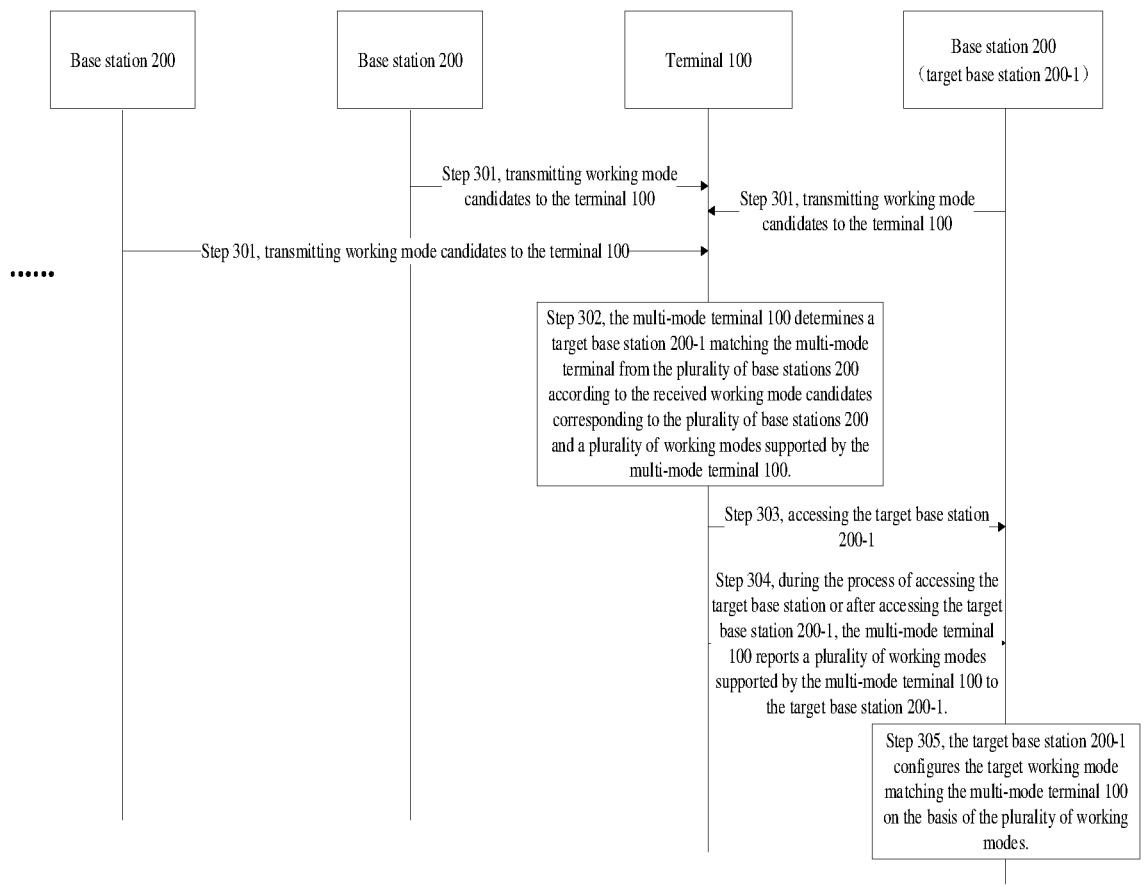
FIG. 5B is a flowchart of a method for accessing a base station in accordance with an exemplary embodiment.

FIG. 5B is a flowchart of a method for accessing a base station according to the scenario embodiment shown in FIG. 5A, which may include the following steps.

In step 301, a base station 200 broadcasts a working mode candidate corresponding to the base station 200 to a multi-mode terminal 100 through system information.

The working mode candidate is a working mode in which the base station 200 supports a terminal accessing thereto to work.

In step 302, the multi-mode terminal 100 determines a target base station 200-1 matching the multi-mode terminal from the plurality of base stations 200 according to the received working mode candidates corresponding to the plurality of base stations 200 and a plurality of working modes supported by the multi-mode terminal 100.

In step 303, the multi-mode terminal 100 accesses the target base station 200-1.

In step 304, during the process of accessing the target base station or after accessing the target base station 200-1, the multi-mode terminal 100 reports a plurality of working modes supported by the multi-mode terminal 100 to the target base station 200-1.

In step 305, the target base station 200-1 configures the target working mode matching the multi-mode terminal 100 on the basis of the plurality of working modes.

In the above embodiment, the multi-mode terminal may select a target base station matching the multi-mode terminal from a plurality of base stations, and access the target base station, thereby ensuring that the multi-mode terminal works normally.

Further, the multi-mode terminal 100 may report the plurality of working modes supported by the multi-mode terminal 100 to the target base station 200-1 during the process of accessing the target base station 200-1 or after accessing the target base station 200-1. The target base station 200-1 selects an appropriate target working mode for the multi-mode terminal 100. The multi-mode terminal 100 may perform network configuration according to the target network configuration information which is returned by the target base station 200-1 and corresponds to the target working mode, and then work in the target mode, thereby also ensuring that the multi-mode terminal can work normally.

Corresponding to the above method embodiments, the present disclosure further provides embodiments of an apparatus and a corresponding terminal.

Figure 6:
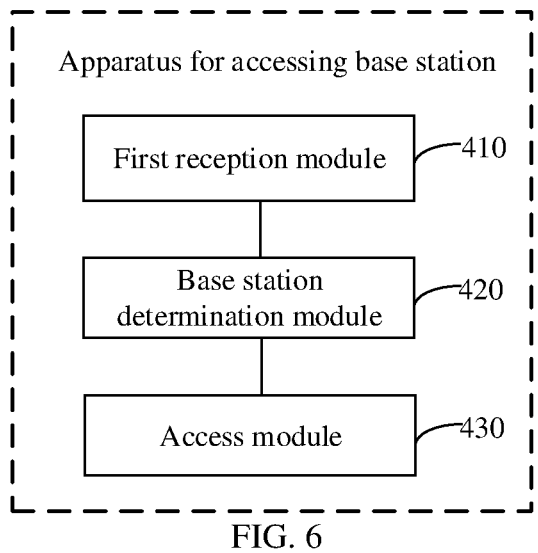
FIG. 6 is a block diagram of an apparatus for accessing a base station in accordance with an exemplary embodiment.

FIG. 6 is a block diagram of an apparatus for accessing a base station in accordance with an exemplary embodiment. The apparatus is applied to a multi-mode terminal, and includes: a first reception module 410 configured to receive working mode candidates which are transmitted by a plurality of base stations and correspond to the plurality of base stations respectively, each of the working mode candidates being a working mode in which the current base station supports a terminal accessing thereto to work; a base station determination module 420 configured to determine a target base station matching the multi-mode terminal from the plurality of base stations according to the working mode candidates and a plurality of working modes supported by the multi-mode terminal; and an access module 430 configured to access the multi-mode terminal to the target base station.

Figure 7:
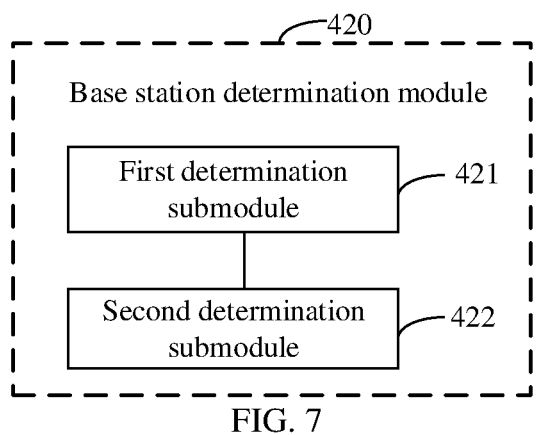
FIG. 7 is a block diagram of an apparatus for accessing a base station in accordance with an exemplary embodiment.

FIG. 7 is a block diagram of an apparatus for accessing a base station in accordance with the embodiment shown in FIG. 6, wherein the base station determination module 420 includes: a first determination submodule 421 configured to determine a target working mode candidate matching any of the plurality of working modes supported by the multi-mode terminal from the working mode candidates; and a second determination submodule 422 configured to determine a target base station matching the multi-mode terminal from the plurality of base stations according to the target working mode candidate.

Figure 8:
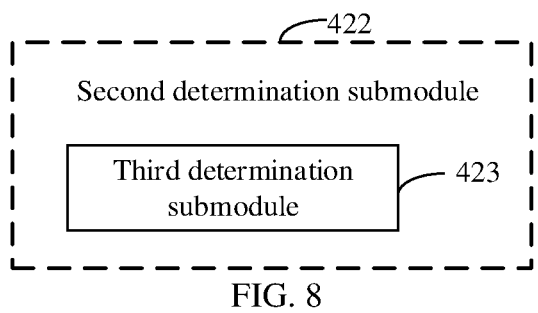
FIG. 8 is a block diagram of an apparatus for accessing a base station in accordance with an exemplary embodiment.

FIG. 8 is a block diagram of another apparatus for accessing a base station in accordance with the embodiment shown in FIG. 7, wherein the second determination submodule 422 includes: a third determination submodule 423 configured to, if the number of the target working mode candidates is equal to 1, use the base station corresponding to the target working mode candidate among the plurality of base stations as the target base station matching the multi-mode terminal.

Figure 9:
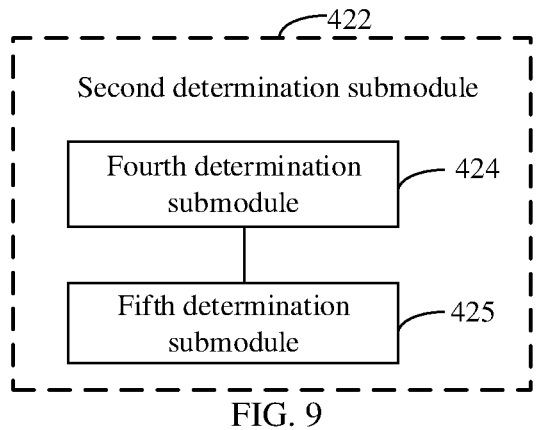
FIG. 9 is a block diagram of an apparatus for accessing a base station in accordance with an exemplary embodiment.

FIG. 9 is a block diagram of another apparatus for accessing a base station in accordance with the embodiment shown in FIG. 7, wherein the second determination submodule 422 includes: a fourth determination submodule 424 configured to, if the number of the target working mode candidates is greater than 1, determine the target working mode candidate matching a current service requirement of the multi-mode terminal; and a fifth determination submodule 425 configured to use a base station corresponding to the target working mode candidate matching the current service requirement as a target base station matching the multi-mode terminal.

Figure 10:
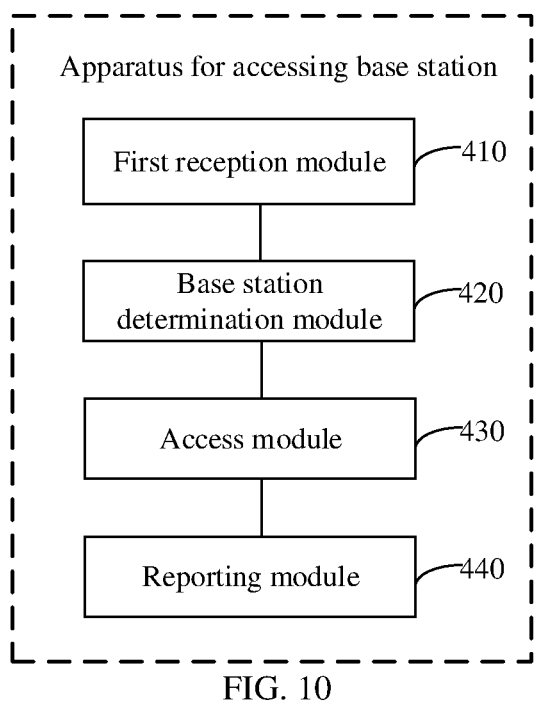
FIG. 10. is a block diagram of an apparatus for accessing a base station in accordance with an exemplary embodiment.

FIG. 10 is a block diagram of another apparatus for accessing a base station in accordance with the embodiment shown in FIG. 6, wherein the apparatus further includes: a reporting module 440 configured to, during the process of accessing the target base station or after accessing the target base station, report the plurality of working modes supported by the multi-mode terminal to the target base station, such that the target base station configures a target working mode matching the multi-mode terminal on the basis of the plurality of working modes.

Figure 11:
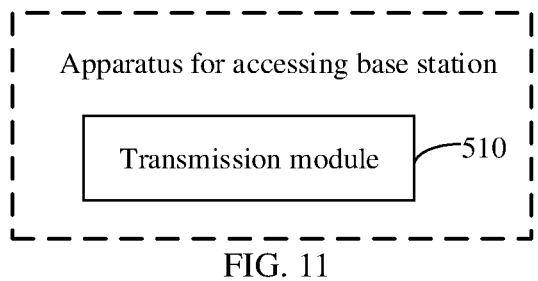
FIG. 11. is a block diagram of an apparatus for accessing a base station in accordance with an exemplary embodiment.

FIG. 11. is a block diagram of an apparatus for accessing a base station in accordance with an exemplary embodiment. The apparatus is applied to a base station, and includes: a transmission module 510 configured to transmit a working mode candidate corresponding to a base station to the multi-mode terminal, such that the multi-mode terminal determines a target base station matching the multi-mode terminal from a plurality of base stations according to the working mode candidates that are transmitted by the plurality of base stations and correspond to the plurality of base stations respectively and a plurality of working modes supported by the multi-mode terminal, wherein each of the working mode candidates is a working mode in which a corresponding base station supports a terminal accessing thereto to work.

Figure 12:
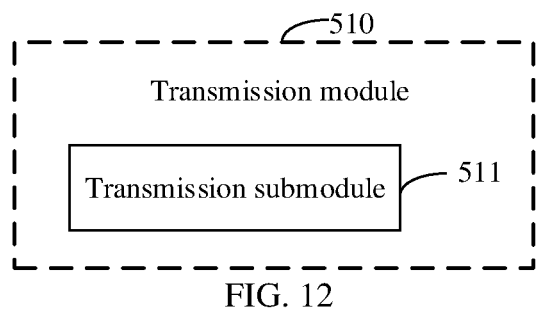
FIG. 12. is a block diagram of an apparatus for accessing a base station in accordance with an exemplary embodiment.

FIG. 12 is a block diagram of an apparatus for accessing a base station in accordance with the embodiment shown in FIG. 11, wherein the transmission module 510 includes: a transmission submodule 511 configured to transmit a working mode candidate corresponding to the base station to the multi-mode terminal by using system information.

Figure 13:
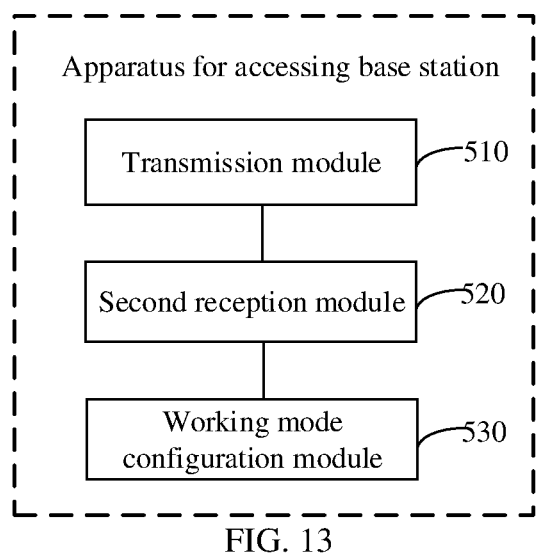
FIG. 13. is a block diagram of an apparatus for accessing a base station in accordance with an exemplary embodiment.

FIG. 13 is a block diagram of another apparatus for accessing a base station in accordance with the embodiment shown in FIG. 11, wherein the apparatus further includes: a second reception module 520 configured to receive the plurality of working modes supported by the multi-mode terminal, which is reported during the process of accessing the base station or after accessing the base station, after the multi-mode terminal determines the base station as the target base station matching the multi-mode terminal; and a working mode configuration module 530 configured to configure the target working mode matching the multi-mode terminal on the basis of the plurality of working modes.

Since the apparatus embodiments substantially correspond to the method embodiments, similar parts of the method embodiments may be referred to for the apparatus embodiments. The above apparatus embodiments are illustrative only. The modules described as separate members may be or may not be physically separated. The members described as modules may be or may not be physical modules, i.e., may be located at the same place or may be distributed in multiple network units. The objectives of the solutions of the present disclosure may be realized by selecting some or all of the modules according to the actual needs. The above can be understood and implemented by those skilled in the art without any inventive work.

Correspondingly, an embodiment of the present disclosure further provides a computer readable storage medium, configured to store computer programs thereon, the computer programs being configured to perform any one of the methods for accessing a base station, which are applied to a multi-mode terminal.

Correspondingly, an embodiment of the present disclosure further provides a computer readable storage medium, configured to store computer programs thereon, the computer programs being configured to perform any one of the methods for accessing a base station, which are applied to the base station.

Correspondingly, an embodiment of the present disclosure further provides an apparatus for accessing a base station, the apparatus being applied to a multi-mode terminal and including: a processor; and a memory configured to store processor executable instructions, wherein the processor is configured to: receive working mode candidates which are transmitted by a plurality of base stations and correspond to the plurality of base stations respectively, each of the working mode candidates being a working mode in which the current base station supports a terminal accessing thereto to work; determine a target base station matching the multi-mode terminal from the plurality of base stations according to the working mode candidates and a plurality of working modes supported by the multi-mode terminal; and access the multi-mode terminal to the target base station.

Figure 14:
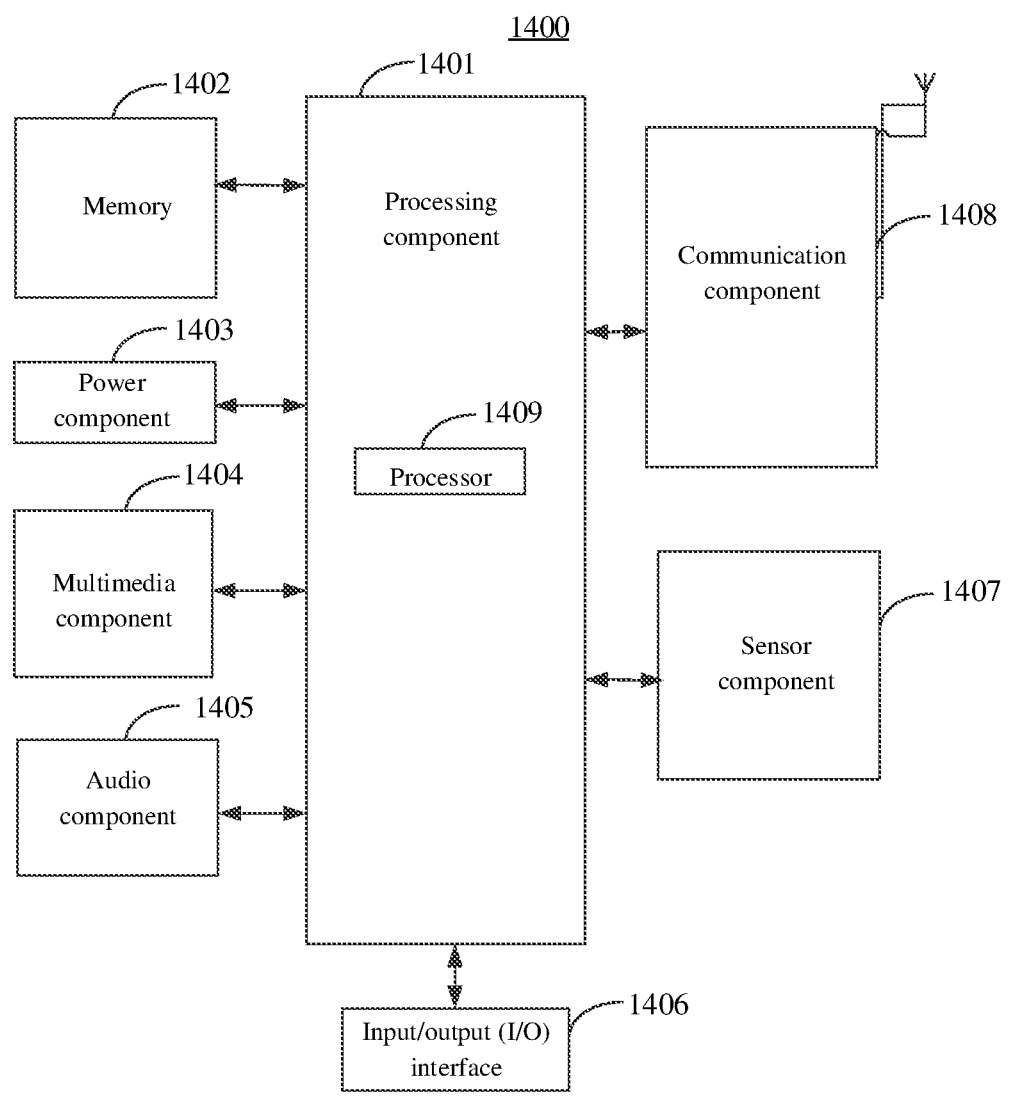
FIG. 14 is a schematic diagram of an apparatus for accessing a base station in accordance with an exemplary embodiment.

FIG. 14 is a schematic diagram of an apparatus 1400 for accessing a base station in accordance with an exemplary embodiment. The apparatus 1400 may be a multi-mode terminal that supports a plurality of working modes.

Referring to FIG. 14, the apparatus 1400 may include one or more of the following components: a processing component 1401, a memory 1402, a power component 1403, a multimedia component 1404, an audio component 1405, an input/output (I/O) interface 1406, a sensor component 1407, and a communication component 1408.

The processing component 1401 typically controls the overall operations of the apparatus 1400, such as the operations associated with display, telephone calls, data communications, camera operations, and recording operations. The processing component 1401 may include one or more processors 1420 to execute instructions to perform all or part of the steps in the above described methods. Moreover, the processing component 1401 may include one or more modules which facilitate the interaction between the processing component 1401 and other components. For instance, the processing component 1401 may include a multimedia module to facilitate the interaction between the multimedia component 1404 and the processing component 1401.

The memory 1402 is configured to store various types of data to support the operation of the apparatus 1400. Examples of such data include instructions for any applications or methods operated on the apparatus 1400, contact data, phonebook data, messages, pictures, videos, etc. The memory 1402 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1403 provides power to various components of the apparatus 1400. The power component 1403 may include a power management system, one or more power sources, and any other components associated with the generation, management, and distribution of power in the apparatus 1400.

The multimedia component 1404 includes a screen providing an output interface between the apparatus 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 1404 includes a front camera and/or a rear camera. The front camera and the rear camera may receive external multimedia data while the apparatus 1400 is in an operation mode, such as a photographing mode or a video mode. Each of the front camera and the rear camera may be a fixed optical lens system or have focus and optical zoom capability.

The audio component 1405 is configured to output and/or input audio signals. For example, the audio component 1405 includes a microphone (MIC) configured to receive external audio signals when the apparatus 1400 is in an operation mode, such as a call mode, a recording mode, and a voice recognition mode. The received audio signal may be further stored in the memory 1402 or transmitted via the communication component 1408. In some embodiments, the audio component 1405 further includes a speaker for outputting audio signals.

The I/O interface 1406 provides an interface between the processing component 1401 and peripheral interface modules, such as a keyboard, a click wheel, buttons, and the like. The buttons may include, but are not limited to, a home button, a volume button, a start button, and a lock button.

The sensor component 1407 includes one or more sensors to provide status assessments of various aspects of the apparatus 1400. For instance, the sensor component 1407 may detect an on/off status of the apparatus 1400, relative positioning of components, e.g., the display device and the mini keyboard of the apparatus 1400, and the sensor component 1407 may also detect a position change of the apparatus 1400 or a component of the apparatus 1400, presence or absence of user contact with the apparatus 1400, orientation or acceleration/deceleration of the apparatus 1400, and temperature change of the apparatus 1400. The sensor component 1407 may include a proximity sensor configured to detect the presence of nearby objects without any physical contact. The sensor component 1407 may also include a light sensor, such as a CMOS or CCD image sensor, used for imaging applications. In some embodiments, the sensor component 1407 may also include an accelerometer sensor, a gyroscope sensor, a magnetic sensor, a pressure sensor, or a temperature sensor.

The communication component 1408 is configured to facilitate communication, wired or wirelessly, between the apparatus 1400 and other devices. The apparatus 1400 can access a wireless network based on a communication standard, such as WiFi, 4G, or 5G, or a combination thereof. In an exemplary embodiment, the communication component 1408 receives broadcast signals or broadcast associated information from an external broadcast management system via a broadcast channel In an exemplary embodiment, the communication component 1408 further includes a near field communication (NFC) module to facilitate short-range communications. In an exemplary embodiment, the communication component 1408 may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 1402 including instructions, executable by the processor 1409 in the apparatus 1400, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by the processor, the apparatus 1400 is caused to perform any of the above method on the terminal side.

The present disclosure further provides an apparatus for accessing a base station, the apparatus being applied to a base station and including: a processor; and a memory configured to store processor executable instructions, wherein the processor is configured to: transmit a working mode candidate corresponding to a base station to the multi-mode terminal, such that the multi-mode terminal determines a target base station matching the multi-mode terminal from a plurality of base stations according to the working mode candidates that are transmitted by the plurality of base stations and correspond to the plurality of base stations respectively and a plurality of working modes supported by the multi-mode terminal, wherein each of the working mode candidates is a working mode in which the current base station supports a terminal accessing thereto to work.

Figure 15:
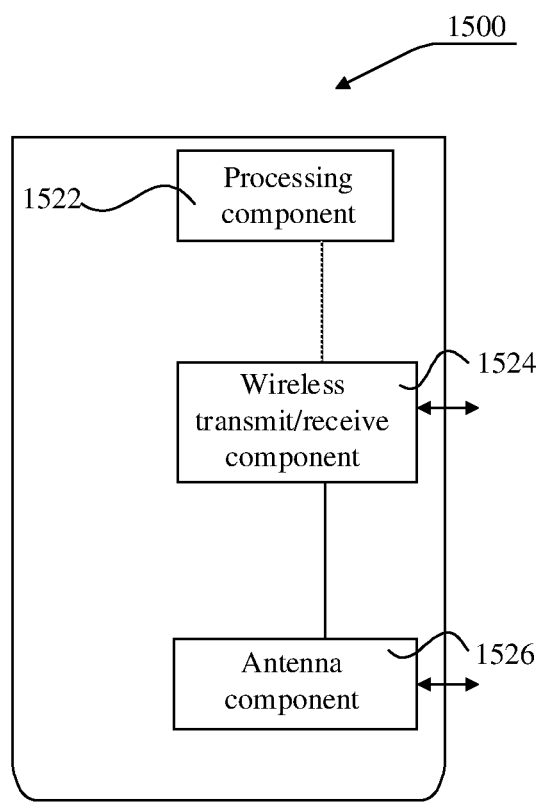
FIG. 15 is a schematic diagram of an apparatus for accessing a base station in accordance with an exemplary embodiment.

FIG. 15 is a schematic diagram of an apparatus 1500 for accessing a base station in accordance with an exemplary embodiment. The apparatus 1500 may be provided as a base station. Referring to FIG. 15, the apparatus 1500 includes a processing component 1522, a wireless transmit/receive component 1524, an antenna component 1526, and a signal processing portion specific to a wireless interface. The processing component 1522 may further include one or more processors.

The working mode candidate corresponding to the base station is transmitted to the multi-mode terminal, such that the multi-mode terminal determines a target base station matching the multi-mode terminal from a plurality of base stations according to the working mode candidates that are transmitted by the plurality of base stations and correspond to the plurality of base stations respectively and a plurality of working modes supported by the multi-mode terminal, wherein each of the working mode candidates is a working mode in which a current base station supports a terminal accessing thereto to work.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A method for accessing a base station, which is applied to a multi-mode terminal and comprises:
   receiving, from a plurality of base stations, working mode candidates corresponding to the plurality of base stations respectively, each of the working mode candidates being a working mode in which a corresponding base station supports a terminal accessing thereto to work, wherein the multi-mode terminal supports numerologies of different working modes, and each of the working modes indicates a carrier band that the multi-mode terminal works on;
   determining a target base station matching the multi-mode terminal from the plurality of base stations according to the working mode candidates and a plurality of working modes supported by the multi-mode terminal; and
   accessing the target base station,
   wherein the determining the target base station matching the multi-mode terminal comprises:
   determining a target working mode candidate matching one of the plurality of working modes supported by the multi-mode terminal from the working mode candidates; and
   determining the target base station matching the multi-mode terminal from the plurality of base stations according to the target working mode candidate, comprising:
      if a number of target working mode candidates is greater than 1, determining a target working mode candidate matching a current service requirement of the multi-mode terminal; and
      determining a base station corresponding to the target working mode candidate matching the current service requirement as the target base station matching the multi-mode terminal, service requirement, the current service requirement including a requirement for the carrier band.

2. The method according to claim 1, wherein the determining the target base station matching the multi-mode terminal from the plurality of base stations according to the target working mode candidate comprises:
   if the number of target working mode candidates is equal to 1, determining the base station corresponding to the working mode candidate of the plurality of base stations as the target base station matching the multi-mode terminal.

3. The method according to claim 1, further comprising:
   during an access procedure of accessing the target base station or after accessing the target base station, reporting the plurality of working modes supported by the multi-mode terminal to the target base station, such that the target base station configures a target working mode matching the multi-mode terminal on the basis of the plurality of working modes.

4. A method for accessing a base station, which is applied to a base station and comprises:
   transmitting one or more working mode candidates corresponding to the base station to a multi-mode terminal, such that the multi-mode terminal determines a target base station matching the multi-mode terminal from a plurality of base stations according to a plurality of working mode candidates that are transmitted by the plurality of base stations and correspond to the plurality of base stations respectively, and a plurality of working modes supported by the multi-mode terminal, wherein the multi-mode terminal supports numerologies of different working modes, and each of the working modes indicates a carrier band that the multi-mode terminal works on,
   wherein each of the plurality of working mode candidates is a working mode in which a corresponding base station supports a terminal accessing thereto to work, and
   wherein the multi-mode terminal determining the target base station matching the multi-mode terminal comprises:
   determining a target working mode candidate matching one of the plurality of working modes supported by the multi-mode terminal from the working mode candidates; and
   determining the target base station matching the multi-mode terminal from the plurality of base stations according to the target working mode candidate, comprising:
      if a number of target working mode candidates is greater than 1, determining a target working mode candidate matching a current service requirement of the multi-mode terminal; and
      determining a base station corresponding to the target working mode candidate matching the current service requirement as the target base station matching the multi-mode terminal, service requirement, the current service requirement including a requirement for the carrier band.

5. The method according to claim 4, after transmitting the one or more working mode candidates corresponding to the base station to the multi-mode terminal, further comprising:
after the multi-mode terminal determines the base station as the target base station matching the multi-mode terminal, receiving, during an access procedure of accessing the target base station or after accessing the target base station, the plurality of working modes supported by the multi-mode terminal; and
configuring a target working mode matching the multi-mode terminal according to the plurality of working modes.

6. A multi-mode terminal, comprising:
a processor; and
a memory storing instructions executable by the processor;
wherein the processor is configured to:
receive, from a plurality of base stations, working mode candidates corresponding to the plurality of base stations respectively, each of the working mode candidates being a working mode in which a corresponding base station supports a terminal accessing thereto to work, wherein the multi-mode terminal supports numerologies of different working modes, and each of the working modes indicates a carrier band that the multi-mode terminal works on;
determine a target base station matching the multi-mode terminal from the plurality of base stations according to the working mode candidates and the plurality of working modes supported by the multi-mode terminal; and
access the target base station,
wherein in determining the target base station matching the multi-mode terminal, the processor is further configured to:
determine a target working mode candidate matching one of the plurality of working modes supported by the multi-mode terminal from the working mode candidates; and
determine the target base station matching the multi-mode terminal from the plurality of base stations according to the target working mode candidate by:
if a number of target working mode candidates is greater than 1, determining a target working mode candidate matching a current service requirement of the multi-mode terminal; and
determining a base station corresponding to the target working mode candidate matching the current service requirement as the target base station matching the multi-mode terminal, service requirement, the current service requirement including a requirement for the carrier band.

7. The multi-mode terminal according to claim 6, wherein in determining a target base station matching the multi-mode terminal from the plurality of base stations according to the target working mode candidate, the processor is further configured to:
if the number of target working mode candidates is equal to 1, determine the base station corresponding to the working mode candidate of the plurality of base stations as the target base station matching the multi-mode terminal.

8. The multi-mode terminal according to claim 6, wherein the processor is further configured to:
during an access procedure of accessing the target base station or after accessing the target base station, report the plurality of working modes supported by the multi-mode terminal to the target base station, such that the target base station configures a target working mode matching the multi-mode terminal on the basis of the plurality of working modes.

9. A base station, comprising:
a processor; and
a memory storing instructions executable by the processor;
wherein the processor is configured to:
transmit one or more working mode candidates corresponding to the base station to a multi-mode terminal, such that the multi-mode terminal determines a target base station matching the multi-mode terminal from a plurality of base stations according to a plurality of working mode candidates that are transmitted by the plurality of base stations and correspond to the plurality of base stations respectively, and a plurality of working modes supported by the multi-mode terminal, wherein the multi-mode terminal supports numerologies of different working modes and each of the working modes indicates a carrier band that the multi-mode terminal works on,
wherein each of the plurality of working mode candidates is a working mode in which a corresponding base station supports a terminal accessing thereto to work, and
wherein the multi-mode terminal determining the target base station matching the multi-mode terminal comprises:
determining a target working mode candidate matching one of the plurality of working modes supported by the multi-mode terminal from the working mode candidates; and
determining the target base station matching the multi-mode terminal from the plurality of base stations according to the target working mode candidate, comprising:
if a number of target working mode candidates is greater than 1, determining a target working mode candidate matching a current service requirement of the multi-mode terminal; and
determining a base station corresponding to the target working mode candidate matching the current service requirement as the target base station matching the multi-mode terminal, service requirement, the current service requirement including a requirement for the carrier band.

10. The base station according to claim 9, wherein after transmitting the one or more working mode candidates corresponding to the base station to the multi-mode terminal, the processor is further configured to:
after the multi-mode terminal determines the base station as the target base station matching the multi-mode terminal, receive, during an access procedure of accessing the target base station or after accessing the target base station, the plurality of working modes supported by the multi-mode terminal; and
configure a target working mode matching the multi-mode terminal according to the plurality of working modes.

11. The method according to claim 1, wherein receiving, from a plurality of base stations, working mode candidates corresponding to the plurality of base stations respectively, comprises:
receiving, from the plurality of base stations, the working mode candidates corresponding to the plurality of base stations respectively by receiving key system information, wherein the key system information includes minimum system information required for the multi-mode terminal to randomly access a base station.

12. The method according to claim 4, wherein transmitting one or more working mode candidates corresponding to the base station to the multi-mode terminal comprises:
   transmitting the one or more working mode candidates corresponding to the base station to the multi-mode terminal by key system information, wherein the key system information includes minimum system information required for the multi-mode terminal to randomly access the base station.

13. The method according to claim 4, wherein transmitting one or more working mode candidates corresponding to the base station to the multi-mode terminal comprises:
   transmitting the one or more working mode candidates corresponding to the base station to the multi-mode terminal by system information.

14. The base station according to claim 9, wherein in transmitting one or more working mode candidates corresponding to the base station to the multi-mode terminal, the processor is further configured to:
   transmit the one or more working mode candidates corresponding to the base station to the multi-mode terminal by system information.

* * * * *